Dec. 7, 1948.  G. BARRETT  2,455,547
REVERSING GEAR
Filed Jan. 30, 1946  2 Sheets-Sheet 1
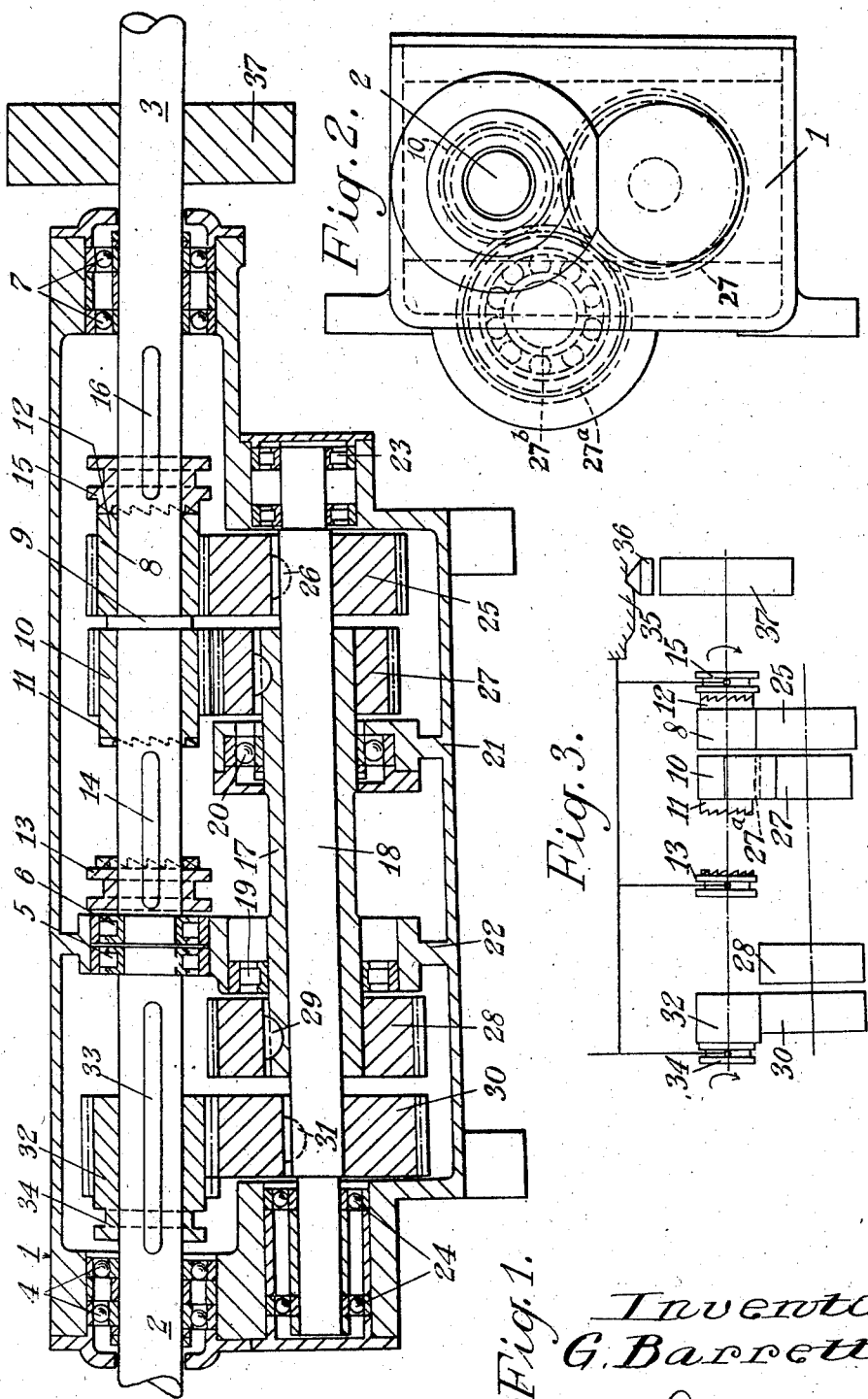
Inventor
G. Barrett
By Glascock Downing Suttle
Attys.

Dec. 7, 1948.  G. BARRETT  2,455,547
REVERSING GEAR
Filed Jan. 30, 1946  2 Sheets-Sheet 2
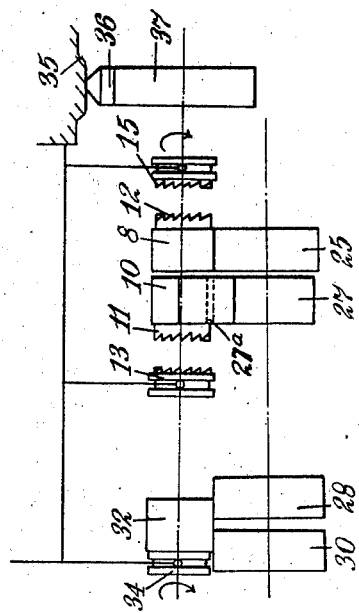
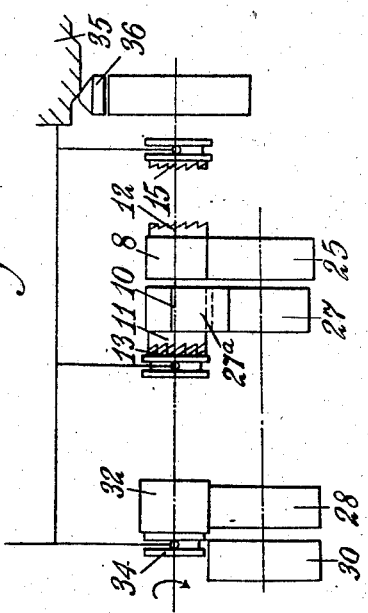
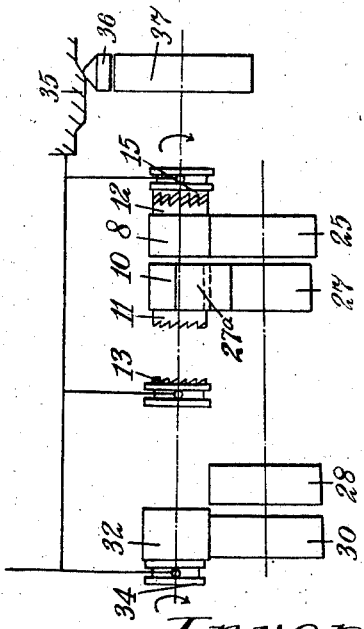
Inventor
G. Barrett Patented Dec. 7, 1948

2,455,547

UNITED STATES PATENT OFFICE 2,455,547

REVERSING GEAR

Guy Barrett, Bosham, near Chichester, England, assignor to Wycliffe Foundry & Engineering Company Limited, Lutterworth, Leicestershire, England Application January 30, 1946, Serial No. 644,313
In Great Britain November 8, 1944

7 Claims. (Cl. 74—377)

This invention relates to reversing gears optionally in association with change speed gears of the kind enabling a change of direction of rotation of a driven shaft with respect to a driving shaft and in the case of constructions embodying a change speed gear an alteration in the ratio of speed of rotation of the driven shaft with respect to the driving shaft to be made.

The object of the invention is broadly stated to provide a construction of reversing gear with which optionally may be associated a change speed gear to provide a drive in the forward or reverse direction of a positive character and thus avoiding the employment of friction clutches or their equivalents.

A particular object of the invention is to provide a construction of reversing gear associated with a change speed gear of the kind in which there are provided two lay shafts which are inclined with respect to the common driving axis of the driving and the driven shafts and the wheels on the lay shafts are conical and of the form provided in change speed units of the type described in U. S. specifications Nos. 1,817,819 and 2,273,404 and in British specification No. 557,941, the wheels being preferably cut generally in accordance with the method described in the last-mentioned specification.

The invention will be described further in detail and by way of example with reference to the accompanying drawings in which—

Figure 1 is a longitudinal view in sectional elevation of a gear box embodying a reversing gear in accordance with the invention;

Figure 2 is a view in end elevation thereof,

Figures 3, 4, 5, 6 and 7 being diagrammatic views illustrating a mode of operating gear.

Referring to Figures 1 and 2, 1 is the gear box or housing through one end of which extends a driving shaft 2 and at the opposite end of which and coaxially with the driving shaft a driven shaft 3, the former being arranged to rotate in ball bearings 4 adjacent to its forward or outer end and a roller bearing 5 adjacent to the other end, the driven shaft being rotatably mounted in roller bearings 6 and ball bearings 7.

On the driven shaft is rotatably mounted, and secured from axial motion with respect thereto, a pinion 8.

On the shaft in question and spaced from this pinion by a collar 9 is a second pinion 10 rotatable on the shaft but secured from axial motion with respect thereto.

With the latter of these pinions and secured from axial motion on the shaft is a dog clutch element 11 and with the other of these a dog clutch element 12, each of these dog clutch elements being in permanent driving connection with its respective pinion.

With one of these dog clutch elements there is associated an axially displaceable dog clutch 13 secured from rotation relative to the shaft by the feather 14 and with the dog clutch element 12 there is arranged to co-operate a dog clutch element 15 slidable along the shaft but secured from rotation relative thereto by the feather 16 so that a driving connection between one or other of the pinions on the driven shaft may be secured.

With the driving and driven shafts there are associated two lay shafts 17 and 18, the former being a tubular shaft rotatably mounted in roller bearings 19 and ball bearings 20 in the standards 22 and 21 provided in the casing 1, the other lay shaft being rotatably secured in roller bearings 23 and ball bearings 24 provided in the ends of the casing.

On one of the lay shafts, namely, the shaft 18, there is provided a pinion 25 in permanent engagement with the pinion 8, the pinion 25 being provided internally with a hemispherical projection 26 engaging a correspondingly formed recess in the shaft 18 to permit a limited degree of motion of the pinion about an axis perpendicular to the axis of the shaft, while on the tubular shaft 17 there is similarly arranged a pinion 27 in permanent driving connection with a pinion 27a, see Figure 2, on a lay shaft 27b and this pinion in turn is in permanent driving engagement with the pinion 10.

On the lay shaft 17 there is also provided a toothed pinion 28 furnished with a hemispherical element 29 engaging a socket on its shaft and in permanent driving engagement therewith, while on the shaft 18 there is provided a toothed wheel 30 similarly provided with a hemispherical element 31 by which it is engaged in permanent driving connection with its shaft.

Both of these toothed wheels are secured from axial motion with respect to their shafts and they are of the following form, that is to say, they are of conical form and are such as are provided in change speed gears of the type described in British specifications Nos. 331,292; 529,506; 539,062 and 557,941, and they are positioned so that one or other of such wheels may be engaged by a pinion 32 slidably mounted upon the driving shaft 2 but secured from rotation relative thereto by the feather 33 and on the pinion in question there is provided a collar 34 for moving it into and out of engagement with the toothed wheels 30 and 28, the length of the face of the pinion being such that in its passage from full engagement with one pinion into engagement with the other pinoin there will be an interval during which time both of such pinions will be engaged by it.

When the wheel 32 is fully engaged with the toothed wheel 30, but disengaged from the pinion 28, a forward drive is secured whereas when the toothed wheel 32 is in full engagement with a toothed wheel 28 but disenggaed from the wheel 30, a drive in the reverse sense is secured.

The toothed wheel 32 and the dog clutch elements 13 and 15 are associated with means whereby motion is imparted to them simultaneously so that the following operations are secured in the sequence stated, namely, disengagement of the slidable dog clutch element 15 co-operating with the dog clutch element 12 of the pinion 8 prior to the engagement of the other slidably mounted dog clutch element 13 with the dog clutch element 11 of the pinion 10 on the driven shaft and prior to the disengagement of the pinion 32 from the pinion 30, that is in changing from the forward to reverse and conversely in changing from reverse to forward.

Preferably, there is provided means 35 adapted also to actuate brake shoes 36 or a brake band co-operating with a brake drum 37 on the driven shaft so that a braking effect is secured on the driven shaft before the dog clutch elements 13 or 15 slidable thereon and which co-operate with the dog clutch elements 11 and 15 in permanent driving connection with the toothed wheel are fully engaged therewith and as above indicated.

This sequence of operations may be understood more clearly by reference to Figures 3, 4, 5, 6 and 7 in which Figure 3 shows the several elements including the braking mechanism in a position for securing a forward drive, Figure 4 illustrates the elements in a position in which the forward drive is about to be interrupted, Figure 5 illustrating the position of the elements when the pinion 32 is simultaneously in engagement with the toothed wheels 29 and 30 and the dog clutch elements 13 and 15 are fully disengaged, the brake being fully applied, and Figure 6 shows the several elements in position when the pinion 32 is in full driving engagement with the toothed wheel 28 but is disengaged from the toothed wheel 30 and the dog clutch element 13 is about to engage the dog clutch element 11.

In this position the commencement of the release of the brake takes place.

Following upon this the several elements are brought into the position shown in Figure 7 where the dog clutch element 13 is in full engagement with the dog clutch element 11 to effect a drive in reverse.

I claim:

1. A reversing gear comprising a driving and a driven shaft arranged coaxially and end to end, a pinion rotatably mounted on the driven shaft but secured from axial motion with respect thereto, a second pinion also rotatably mounted on the driven shaft but secured from axial motion with respect thereto and in permanent driving connection with each of these pinions and secured from axial motion a dog clutch element, with each of which an axially displaceable dog clutch element rotatable with the driven shaft is associated to establish a driving connection between its related pinion and the driven shaft, two lay shafts each furnished with a toothed wheel, one in permanent and direct engagement with the first-mentioned pinion and the other through an idler wheel with the second-mentioned pinion, and on each of such lay shafts a toothed wheel positioned so that the one or the other of such wheels may be engaged by a pinion slidably mounted on the driving shaft but secured from rotation relative thereto and means adapted to secure simultaneous axial displacement of the pinion slidably mounted on the driving shaft and the dog clutch elements slidably mounted on the driven shaft to secure in changing from "forward" to "reverse" the following operations in the sequence stated: disengagement of the slidable dog clutch element co-operating with the dog clutch element of the first-mentioned pinion rotatably mounted on the driven shaft prior to the engagement of the other slidably mounted dog clutch element with the second-mentioned pinion mounted on the driven shaft and prior to the disengagement of the pinion slidably mounted on the driving shaft from the toothed wheel mounted on the lay shaft which is in permanent driving connection with the first-mentioned pinion and conversely in changing from "reverse" to "forward."

2. A reversing gear comprising a driving and a driven shaft arranged coaxially and end to end, a lay shaft, a toothed wheel on the lay shaft in driving connection with a pinion rotatably mounted on the driven shaft but secured from axial motion with respect thereto, a dog clutch element rotatable on the driven shaft and in permanent driving connection with the pinion, a dog clutch element on the driven shaft slidable thereon but secured from rotation relative thereto adapted to engage with and to be disengaged from the dog clutch element rotatable on the driven shaft and in permanent driving connection with the pinion, a tubular lay shaft surrounding the first mentioned lay shaft, a toothed wheel on the tubular shaft, an idler wheel in engagement therewith, and in engagement with the idler wheel a pinion rotatably mounted on but secured from axial motion with respect to the driven shaft, a dog clutch element rotatable on the shaft and in permanent driving connection with this pinion, a dog clutch element mounted on the driven shaft secured from rotation relative thereto but slidable axially along it to bring it into and out of engagement with the dog clutch element rotatable on its shaft and in permanent driving connection with this pinion, on the lay shaft a toothed wheel and on the tubular shaft a toothed wheel at a position adjacent to the toothed wheel on the lay shaft and on the driving shaft permanently secured from rotation relative thereto, but slidable axially thereon to bring it out of and into driving engagement with the toothed wheel on the lay shaft and into and out of engagement with the toothed wheel on the tubular shaft to provide in the former case a forward drive and in the latter case a drive in reverse of the driven shaft, and means adapted to secure simultaneous axial displacement of the pinion slidably mounted on the driving shaft and the dog clutch elements slidably mounted on the driven shaft to secure in changing from "forward" to "reverse" the following operations in the sequence stated: disengagement of the slidable dog clutch element co-operating with the dog clutch element of the first-mentioned pinion rotatably mounted on the driven shaft prior to the engagement of the other slidably mounted dog clutch element with the second-mentioned pinion mounted on the driven shaft and prior to the disengagement of the pinion slidably mounted on the driving shaft from the toothed wheel mounted on the lay shaft which is in permanent driving connection with the first-mentioned pinion and conversely in changing from "reverse" to "forward."

3. A reversing gear as claimed in claim 1 in which the width of the face of the pinion slidably mounted on the driving shaft and the positions of the toothed wheels with which it co-operates on the lay shafts is such that in its displacement the pinion will temporarily be in driving engagement with both of such wheels before the dog clutch element slidably mounted on the driven shaft is brought into engagement with the dog clutch element of the second-mentioned pinion.

4. A reversing gear as claimed in claim 1 in which the means adapted to impart motion to the pinion slidably mounted on the driving shaft and the slidable dog clutch elements is also arranged to actuate brake shoes or a brake band co-operating with a drum mounted on the driven shaft so that a braking effect is secured on the driven shaft before the dog clutch element mounted thereon and which co-operates with the dog clutch element in permanent driving connection with the second-mentioned pinion is fully engaged therewith.

5. A reversing gear as claimed in claim 1 in which to facilitate engagement of the pinion slidably mounted on a driven shaft with the toothed wheels on the lay shafts, and further to facilitate such engagement the side faces or edges of the teeth on the wheels are bevelled, chamfered or rounded.

6. A reversing gear as claimed in claim 1 in which the side faces or edges of the slidable pinion are also bevelled, chamfered or rounded.

7. A reversing gear as claimed in claim 1 in which the axes of the lay shafts are inclined with respect to the common axis of the driving and the driven shafts, and in which the wheels on the lay shafts are conical.

GUY BARRETT.

REFERENCES CITED

The following references are of record in the file of this patent:

UNITED STATES PATENTS

| Number | Name | Date |
|---|---|---|
| 1,269,944 | Leonard | June 18, 1918 |
| 2,344,046 | Le Tourneau | Mar. 14, 1944 |